US010696870B2

(12) United States Patent
Iwata

(10) Patent No.: US 10,696,870 B2
(45) Date of Patent: Jun. 30, 2020

(54) POLISHING COMPOSITION FOR MAGNETIC DISK SUBSTRATE

(71) Applicant: YAMAGUCHI SEIKEN KOGYO CO., LTD., Aichi (JP)

(72) Inventor: Toru Iwata, Aichi (JP)

(73) Assignee: YAMAGUCHI SEIKEN KOGYO CO., LTD. (JP)

(*) Notice: Subject to any disclaimer, the term of this patent is extended or adjusted under 35 U.S.C. 154(b) by 328 days.

(21) Appl. No.: 15/934,786

(22) Filed: Mar. 23, 2018

(65) Prior Publication Data
US 2018/0273803 A1    Sep. 27, 2018

(30) Foreign Application Priority Data

Mar. 23, 2017 (JP) ................. 2017-058047

(51) Int. Cl.
B24B 37/04      (2012.01)
C09G 1/02       (2006.01)
C09K 3/14       (2006.01)
C01B 33/14      (2006.01)
B24B 29/00      (2006.01)
G11B 5/84       (2006.01)

(52) U.S. Cl.
CPC ................ *C09G 1/02* (2013.01); *B24B 29/00* (2013.01); *B24B 37/044* (2013.01); *B24B 37/048* (2013.01); *C01B 33/14* (2013.01); *C09K 3/1463* (2013.01); *G11B 5/8404* (2013.01)

(58) Field of Classification Search
CPC ......... C09G 1/02; B24B 29/00; B24B 37/044; B24B 37/048; C01B 33/14; C09K 3/1463; G11B 5/8404
USPC ............................. 451/42, 60, 446, 285–290
See application file for complete search history.

(56) References Cited

U.S. PATENT DOCUMENTS

| 5,904,159 | A  | * | 5/1999 | Kato ..................... C09G 1/02 134/1.3 |
| 6,261,476 | B1 | * | 7/2001 | Kwok ..................... C09G 1/02 106/3 |
| 6,293,848 | B1 | * | 9/2001 | Fang ..................... C09K 3/1463 252/79.1 |
| 2002/0102923 | A1 | * | 8/2002 | Sugiyama ................ C09G 1/02 451/41 |
| 2002/0195421 | A1 | * | 12/2002 | Srinivasan .............. C09G 1/02 216/38 |
| 2003/0068893 | A1 | * | 4/2003 | Nishida ................. C09G 1/02 438/694 |
| 2005/0106317 | A1 | * | 5/2005 | Shino .................... B41M 5/502 427/180 |
| 2008/0003928 | A1 | * | 1/2008 | Matsunami ............ C09K 3/1409 451/60 |
| 2009/0111359 | A1 |   | 4/2009 | Suzuki et al. |
| 2009/0124172 | A1 | * | 5/2009 | Uchikura ................ C09G 1/02 451/36 |
| 2010/0009537 | A1 |   | 1/2010 | Balasubramaniam et al. |
| 2011/0203186 | A1 |   | 8/2011 | Oshima et al. |
| 2012/0045974 | A1 |   | 2/2012 | Nakanishi et al. |
| 2014/0020305 | A1 | * | 1/2014 | Kordonski .............. C09G 1/02 51/309 |
| 2014/0045412 | A1 | * | 2/2014 | Yuska ................... C11D 7/261 451/59 |
| 2015/0056122 | A1 | * | 2/2015 | Takahashi ......... H01L 21/02024 423/348 |
| 2015/0098887 | A1 | * | 4/2015 | Iwano ................. C09K 3/1463 423/325 |

FOREIGN PATENT DOCUMENTS

| JP | 200126005 A | 9/2001 |
| JP | 2009176397 A | 8/2009 |
| JP | 2010167553 A | 8/2010 |
| JP | 2011204327 A | 10/2011 |
| JP | 2011527643 A | 11/2011 |
| JP | 2012043493 A | 3/2012 |
| JP | 2012155785 A | 8/2012 |
| JP | 2014029754 A | 2/2014 |
| JP | 2014029755 A | 2/2014 |

* cited by examiner

Primary Examiner — George B Nguyen
(74) Attorney, Agent, or Firm — Bracewell LLP; Brad Y. Chin

(57) ABSTRACT

Embodiments provide a polishing composition for a magnetic disk substrate, which contains colloidal silica having an average primary particle size of 5 to 200 nm, fumed silica having an average particle size of 30 to 800 nm, pulverized wet-process silica particles having an average particle size of 100 to 1000 nm, and water. According to an embodiment, a ratio of the colloidal silica is 5 to 90% by mass, a ratio of the fumed silica is 5 to 90% by mass, and a ratio of the pulverized wet-process silica particles is 5 to 90% by mass with respect to all the silica particles, and a concentration of all the silica particles is 1 to 50% by mass.

7 Claims, No Drawings

POLISHING COMPOSITION FOR MAGNETIC DISK SUBSTRATE

CROSS-REFERENCE TO RELATED APPLICATION

This application claims the benefit of and priority to Japanese Patent Application No. JP2017-058047, filed on Mar. 23, 2017, with the Japanese Patent Office, the entire contents of which are incorporated herein by reference.

BACKGROUND

Field

Embodiments relate to a polishing composition used for polishing an electronic component of a magnetic recording medium such as a hard disk. Particularly, embodiments relate to a polishing composition used for polishing a surface of a substrate for a magnetic recording medium such as a glass magnetic disk substrate or an aluminum magnetic disk substrate. Furthermore, embodiments relate to a polishing composition used for polishing a surface of an aluminum magnetic disk substrate for a magnetic recording medium having an electroless nickel-phosphorus plated film formed on a surface of an aluminum alloy substrate.

Description of the Related Art

Conventionally, as a polishing composition for polishing an electroless nickel-phosphorous plated film surface of an aluminum magnetic disk substrate, a polishing composition obtained by dispersing alumina particles having a relatively large particle size capable of realizing a high polishing rate in water has been used from a viewpoint of productivity. However, in a case of using alumina particles, the alumina particles have a considerably higher hardness than the electroless nickel-phosphorus plated film of the aluminum magnetic disk substrate. Therefore, alumina particles are embedded in the substrate, and the embedded particles have a bad influence on a subsequent polishing step disadvantageously.

As a solution to such a problem, a polishing composition combining alumina particles and silica particles has been proposed (See, for example, Patent Documents 1 to 4). Furthermore, a polishing method only with silica particles without using alumina particles has been proposed (See, for example, Patent Documents 5 to 9).

[Patent Document 1] JP-A-2001-260005
[Patent Document 2] JP-A-2009-176397
[Patent Document 3] JP-A-2011-204327
[Patent Document 4] JP-A-2012-43493
[Patent Document 5] JP-A-2010-167553
[Patent Document 6] JP-A-2011-527643
[Patent Document 7] JP-A-2014-29754
[Patent Document 8] JP-A-2014-29755
[Patent Document 9] JP-A-2012-155785

SUMMARY

By combining alumina particles and silica particles as described in Patent Documents 1 to 4, it is possible to remove alumina particles embedded in a substrate to some extent. However, as long as the polishing composition containing alumina particle is used, a possibility that the alumina particles contained in the polishing composition are embedded in a substrate still remains. In addition, such a polishing composition contains both alumina particles and silica particles. Therefore, properties possessed by the particles are mutually canceled and a polishing rate and surface smoothness are deteriorated disadvantageously.

Therefore, a polishing method only with silica particles without using alumina particles has been proposed. Patent Documents 5 and 6 propose a combination of colloidal silica and a polishing accelerator. Patent Documents 7 and 8 propose a polishing method with colloidal silica, fumed silica, surface modified silica, silica manufactured by a water glass process, or the like, particularly a method using colloidal silica having a special shape. However, with these methods, a polishing rate is insufficient and improvement is demanded.

In addition, Patent Document 9 proposes a method for obtaining a polishing rate close to that of alumina particles by using crushed silica particles. However, with this method, surface smoothness is deteriorated disadvantageously, and improvement is demanded.

Embodiments of the invention have been achieved in view of such a problem of related art. An object of various embodiments is to provide a polishing composition for a magnetic disk substrate capable of realizing a high polishing rate without using alumina particles and at the same time achieving good surface smoothness.

Embodiments demonstrate that a high polishing rate and good surface smoothness can be achieved by combining colloidal silica having a specific particle size, fumed silica having a specific particle size, and pulverized wet-process silica particles having a specific particle size, and have completed the present invention. That is, embodiments provide a polishing composition for a magnetic disk substrate.

According to at least one embodiment, there is provided a polishing composition for a magnetic disk substrate, containing colloidal silica having an average primary particle size of 5 to 200 nm, fumed silica having an average particle size of 30 to 800 nm, pulverized wet-process silica particles having an average particle size of 100 to 1000 nm, and water, in which a ratio of the colloidal silica is 5 to 90% by mass, a ratio of the fumed silica is 5 to 90% by mass, and a ratio of the pulverized wet-process silica particles is 5 to 90% by mass with respect to all the silica particles, and a concentration of all the silica particles is 1 to 50% by mass.

According to at least one embodiment, the colloidal silica has an average primary particle size of 10 to 150 nm, the fumed silica has an average particle size of 60 to 600 nm, and the pulverized wet-process silica particles have an average particle size of 200 to 800 nm.

According to at least one embodiment, a ratio of the colloidal silica is 10 to 80% by mass, a ratio of the fumed silica is 10 to 80% by mass, and a ratio of the pulverized wet-process silica particles is 10 to 80% by mass with respect to all the silica particles.

According to at least one embodiment, a concentration of all the silica particles is 2 to 40% by mass.

According to at least one embodiment, the polishing composition further contains an acid, and has a pH value (25° C.) of 0.1 to 4.0.

According to at least one embodiment, the polishing composition further contains an oxidizing agent.

According to at least one embodiment, the polishing composition for the magnetic disk substrate can be used for polishing an electroless nickel-phosphorus plated aluminum magnetic disk substrate.

Embodiments provide non-obvious advantages over the conventional art. For example, the polishing composition according to various embodiments can realize an unexpectedly high polishing rate and achieve good surface smoothness by combining three types of silica particles when a surface of a magnetic disk substrate is polished. Particularly, the polishing composition can be preferably used for polishing an aluminum substrate for a magnetic recording medium having an electroless nickel-phosphorus plated film formed on a surface of an aluminum alloy substrate.

DETAILED DESCRIPTION

Hereinafter, various embodiments will be described, but the invention is not limited to the following embodiments. It should be understood that matters obtained by performing modification of the following embodiments, improvement thereof, or the like appropriately within a range not departing from the gist of the invention based on usual knowledge of a person skilled in the art are also included in the scope of the invention.

1. Polishing Composition

A polishing composition according to at least one embodiment is an aqueous composition containing colloidal silica, fumed silica, pulverized wet-process silica particles, and water. The colloidal silica has an average primary particle size of 5 to 200 nm, the fumed silica has an average particle size of 30 to 800 nm, and the pulverized wet-process silica particles have an average particle size of 100 to 1000 nm. Here, the wet-process silica particles are pulverized by pulverization in a manufacturing process thereof. That is, the process for manufacturing wet-process silica particles includes a pulverization step. In addition, a ratio of the colloidal silica is 5 to 90% by mass, a ratio of the fumed silica is 5 to 90% by mass, and a ratio of the pulverized wet-process silica particles is 5 to 90% by mass with respect to all the silica particles, and a concentration of all the silica particles is 1 to 50% by mass.

Hereinafter, the polishing composition according to various embodiments will be described in more detail. In the following description, a simple term "polishing composition" means the polishing composition according to an aspect of the present invention unless otherwise specified. In addition, in the following description, simple terms "colloidal silica", "fumed silica", and "wet-process silica particles" mean colloidal silica, fumed silica, and wet-process silica particles used in the present invention, respectively, unless otherwise specified.

1-1. Colloidal Silica

Colloidal silica contained in the polishing composition according to at least one embodiment has an average primary particle size of 5 to 200 nm. The average primary particle size of 5 nm or more can suppress reduction in polishing rate. The average primary particle size of 200 nm or less can suppress deterioration of surface smoothness of a substrate after polishing. The average primary particle size of the colloidal silica is preferably 10 to 150 nm, and more preferably 30 to 100 nm. The particle size of the colloidal silica is measured as a Heywood diameter (projected area equivalent circular diameter) by analyzing a photograph taken with a transmission electron microscope. A particle size at which a cumulative particle size distribution (on a cumulative volume basis) from a smaller particle size reaches 50% is taken as an average primary particle size (D50).

Colloidal silica is known in various shapes, for example, in spherical, kompeito-typed (like particles having convexes on the surface), heteromorphic, and other shapes, and forms colloid in which primary silica particles are monodispersed in water. As the colloidal silica used in the various embodiments, spherical or approximately spherical colloidal silica is preferable. By using spherical or approximately spherical colloidal silica, surface smoothness can be further improved. The colloidal silica is manufactured by a water glass process using sodium silicate or potassium silicate as a raw material, an alkoxysilane method to obtain colloidal silica by hydrolyzing an alkoxysilane such as tetraethoxysilane with an acid or an alkali, or the like.

1-2. Fumed Silica

Fumed silica contained in the polishing composition according to at least one embodiment has an average particle size of 30 to 800 nm. The average particle size of 30 nm or more can suppress reduction in polishing rate. The average particle size of 800 nm or less can suppress deterioration of surface smoothness of a substrate after polishing. The fumed silica has an average particle size of preferably 60 to 600 nm, more preferably 80 to 400 nm.

According to at least one embodiment, the fumed silica is obtained by hydrolyzing a volatile silane compound (generally silicon tetrachloride is used) in a flame of a mixed gas of oxygen and hydrogen (about 1000° C.), and is formed of extremely fine silica particles with highly purity. Compared with colloidal silica, colloidal silica exists as primary particles dispersed individually, whereas the fumed silica forms a secondary particle by aggregation of many primary particles and connection thereof in a chain shape. By forming the secondary particle, holding power to a polishing pad is increased, and a polishing rate can be improved.

Note that, in the technique disclosed herein, unless otherwise specified, the average particle size of the fumed silica means an average particle size (D50) at which a cumulative particle size distribution from a smaller particle size reaches 50% on a volume basis based on a dynamic light scattering method. The average particle size of the fumed silica means an average particle size of particles dispersed in the polishing composition regardless of whether the particles are primary particles or secondary particles.

1-3. Wet-Process Silica Particles

Wet-process silica particles used in various embodiments refer to particles prepared from wet-process silica obtained as precipitated silicic acid by adding an alkali silicate aqueous solution and an inorganic acid or an inorganic acid aqueous solution to a reaction vessel. The wet-process silica particles do not include the above-described colloidal silica.

Examples of the alkali silicate aqueous solution which is a raw material of the wet-process silica particles include a sodium silicate aqueous solution, a potassium silicate aqueous solution, and a lithium silicate aqueous solution, but in general, sodium silicate is preferably used. Examples of the inorganic acid include sulfuric acid, hydrochloric acid, and nitric acid, but in general, sulfuric acid is preferably used. After completion of a reaction, a reaction solution is filtered, washed with water, and then dried with a dryer such that the water content is 6% or less. The dryer may be any one of a stationary dryer, a spray dryer, and a fluidized dryer. Thereafter, the dried product is pulverized with a pulverizer such as a jet mill, and is further classified to obtain wet-process silica particles.

The particle shape of each of the wet-process silica particles pulverized by pulverization as described above has a corner portion, and has higher polishing ability than particles having an approximately spherical shape.

The wet-process silica particles have an average particle size of preferably 100 to 1000 nm, more preferably 200 to 800 nm, still more preferably 200 to 600 nm. The average particle size of 100 nm or more can suppress reduction in polishing rate. The average particle size of 1000 nm or less can suppress deterioration of surface smoothness of a substrate after polishing. The average particle size of the wet-process silica particles is an average particle size (D50) at which a cumulative particle size distribution from a smaller particle size reaches 50% on a volume basis.

A ratio of the colloidal silica with respect to all the silica particles is 5 to 90% by mass, preferably 10 to 80% by mass, and more preferably 10 to 70% by mass. A ratio of the fumed silica with respect to all the silica particles is 5 to 90% by mass, preferably 10 to 80% by mass, and more preferably 10 to 70% by mass. A ratio of the wet-process silica particles with respect to all the silica particles is 5 to 90% by mass, preferably 10 to 80% by mass, and more preferably 10 to 70% by mass. By setting the ratios of the three types of silica particles within these ranges, a balance between a polishing rate and surface smoothness (pit and waviness) after polishing can be improved.

A concentration of all the silica particles is 1 to 50% by mass, and preferably 2 to 40% by mass in the entire polishing composition. The concentration of all the silica particles of 1% by mass or more can suppress reduction in polishing rate. The concentration of all the silica particles of 50% by mass or less makes it possible to maintain a sufficient polishing rate without using excessive silica particles.

1-4. Other Components

In addition to the above components, the polishing composition may contain an acid, an oxidizing agent, a water-soluble polymer, a buffer agent, a fungicide, a microbicide, and the like as a component contained in the polishing composition. Among these components, an acid and/or an oxidizing agent are/is preferably contained.

Specific examples of the acid include: an inorganic acid such as nitric acid, sulfuric acid, hydrochloric acid, phosphoric acid, phosphonic acid, phosphinic acid, pyrophosphoric acid, or tripolyphosphoric acid; an organic phosphonic acid such as 2-aminoethylphosphonic acid, 1-hydroxyethylidene-1,1-diphosphonic acid, aminotri (methylenephosphonic acid), ethylenediamine tetra (methylenephosphonic acid), diethylenetriamine (methylenephosphonic acid), ethane-1,1-diphosphonic acid, or methane hydroxyphosphonic acid; an amino carboxylic acid such as glutamic acid or aspartic acid; and a carboxylic acid such as citric acid, tartaric acid, oxalic acid, nitroacetic acid, or maleic acid. The amount of an acid used is appropriately determined according to a set pH value of the polishing composition.

Examples of the oxidizing agent include peroxide, permanganic acid or a salt thereof, chromic acid or a salt thereof, and periodic acid or a salt thereof. Specific examples thereof include hydrogen peroxide, sodium peroxide, barium peroxide, potassium permanganate, orthoperiodic acid, and sodium metaperiodate. Among these compounds, hydrogen peroxide is preferable. The content of an oxidizing agent in the polishing composition is usually in a range of 0.1 to 10.0% by mass.

1-5. Physical Properties

A pH value (25° C.) of the polishing composition according to at least one embodiment is preferably 0.1 to 4.0, and more preferably 0.5 to 3.0. The pH value (25° C.) of the polishing composition of 0.1 or more can suppress deterioration of surface smoothness. The pH value (25° C.) of the polishing composition of 4.0 or less can suppress reduction in polishing rate. In electroless nickel-phosphorus plating, nickel tends to be dissolved at a pH value (25° C.) of 4.0 or less, and therefore plating does not proceed easily. Meanwhile, in polishing, for example, nickel tends to be dissolved at a pH value (25° C.) of 4.0 or less, and therefore use of the polishing composition according to at least one embodiment can increase a polishing rate.

2. Method for Polishing Magnetic Disk Substrate

The polishing composition according to at least one embodiment is suitable for use in polishing a magnetic disk substrate such as an electroless nickel-phosphorus plated aluminum magnetic disk substrate (hereinafter, referred to as an "aluminum disk") or a glass magnetic disk substrate. The polishing composition is particularly suitable for polishing an aluminum disk.

Examples of a polishing method to which the polishing composition according to at least one embodiment can be applied include a method for pasting a polishing pad on a surface plate of a polishing machine, supplying a polishing composition to a surface to be polished in a polishing target (for example, an aluminum disk) or the polishing pad, and rubbing the surface to be polished with the polishing pad (called polishing). For example, in a case where front and back surfaces of an aluminum disk are polished simultaneously, a double-side polishing machine in which polishing pads are pasted on an upper surface plate and a lower surface plate can be used. In this method, a polishing composition is supplied between polishing pads pasted on an upper surface plate and a lower surface, the two polishing pads are rotated simultaneously, and front and back surfaces of the aluminum disk are thereby polished.

A polyurethane type, suede type, nonwoven fabric type, or any other type polishing pad can be used.

EXAMPLES

Hereinafter, various embodiments will be specifically described based on Examples, but the invention is not limited to these Examples, and various modes can be performed as long as being within the technical scope of the various embodiments of the invention.

(1) Method for Preparing Polishing Composition

Polishing compositions used in Examples 1 to 6 and Comparative Examples 1 to 8 contain the following materials in the following contents. Note that, in all Examples and Comparative Examples, a concentration of all the silica particles was 4% by mass and a pH of a polishing composition was 1.3. Results of a polishing test preformed using these polishing compositions are listed in Table 1.

(Colloidal silica 1) (average primary particle size (D50): 50 nm, commercially available colloidal silica) A ratio of colloidal silica 1 in all the silica particles was 30% by mass, and colloidal silica 1 was used in Examples 1, 3, and 5, and Comparative Examples 1, 3, and 5.

(Colloidal silica 2) (average primary particle size (D50): 80 nm, commercially available colloidal silica) A ratio of colloidal silica 2 in all the silica particles was 30% by mass, and colloidal silica 2 was used in Examples 2, 4, and 6 and Comparative Examples 2, 4, and 6.

(Fumed silica) (average particle size (D50): 270 nm, commercially available fumed silica) A ratio of fumed silica in all the silica particles is listed in Table 1. Fumed silica was used in Examples 1 to 6 and Comparative Examples 1, 2, 7, and 8.

(Wet-process silica particles 1) (average particle size (D50): 280 nm, commercially available wet-process silica particles) A ratio of wet-process silica particles 1 in all the silica particles is listed in Table 1. Wet-process silica particles 1 were used in Examples 1, 2, 3, and 4 and Comparative Examples 3, 4, and 7.

(Wet-process silica particles 2) (average particle size (D50): 350 nm, commercially available wet-process silica particles) A ratio of wet-process silica particles 2 in all the silica particles is listed in Table 1. Wet-process silica particles 2 were used in Examples 5 and 6 and Comparative Examples 5, 6, and 8.

(Sulfuric acid) The amount of sulfuric acid added was adjusted such that a polishing composition had a pH of 1.3. Sulfuric acid was used in Examples 1 to 6 and Comparative Examples 1 to 8.

(Hydrogen peroxide) Hydrogen peroxide was used in an amount of 0.89% by mass in Examples 1 to 6 and Comparative Examples 1 to 8.

(2) Method for Measuring Particle Size of Silica Particle

The particle size (Heywood diameter) of colloidal silica was measured as a Heywood diameter (projected area equivalent circular diameter) by taking a photograph in a visual field at a magnitude of 100,000 with a transmission electron microscope (TEM) (manufactured by JEOL Ltd., transmission electron microscope JEM2000FX (200 kV)) and analyzing the photograph using an analysis software (manufactured by Mountech Co., Ltd., Mac-View Ver. 4.0). The average primary particle size of colloidal silica is an average primary particle size (D50) when the particle diameters of about 2000 particles of colloidal silica were analyzed as described above and the particle size at which the cumulative particle size distribution (on a cumulative volume basis) from a smaller particle size reaches 50% is calculated using an above-mentioned analysis software (Mac-View Ver. 4.0, manufactured by Mountech CO., Ltd.).

An average particle size of fumed silica was measured using a dynamic light scattering particle size distribution analyzer (manufactured by Nikkiso Co., Ltd., Microtrac UPA). The average particle size of the fumed silica is an average particle size (D50) at which a cumulative particle size distribution from a smaller particle size reaches 50% on a volume basis.

An average particle size of wet-process silica particles was measured using a dynamic light scattering particle size distribution analyzer (manufactured by Nikkiso Co., Ltd., Microtrac UPA). The average particle size of the wet-process silica particles is an average particle size (D50) at which a cumulative particle size distribution from a smaller particle size reaches 50% on a volume basis.

(3) Polishing Conditions

An electroless nickel-phosphorus plated aluminum disk having an outer diameter of 95 mm was used as a substrate to be polished, and was polished under the following polishing conditions.

Polishing machine: 9B double-sided polishing machine manufactured by System Seiko Co., Ltd.

Polishing pad: P1 pad manufactured by FILWEL Co., Ltd.

Surface plate rotating speed: upper surface plate −9.0 $min^{-1}$; Lower surface plate 12.0 $min^{-1}$ Feed of polishing composition: 90 ml/min Polishing time: Polishing is performed until the polishing amount reaches 1.2 to 1.5 μm/one side (240 to 720 seconds).

Processing pressure: 120 kPa (4) Polishing Rate Ratio

The mass of an aluminum disk which had been reduced after polishing was measured, and a polishing rate was calculated based on the following formula.

Polishing rate (μm/min)=reduced amount in mass of aluminum disk (g)/polishing time (min)/area of one side of aluminum disk ($cm^2$)/density of electroless nickel-phosphorus plated film (g/$cm^3$)/2×$10^4$ (Provided that, in the above formula, the area of one side of an aluminum disk was 65.9 $cm^2$, and the density of an electroless nickel-phosphorus plated film was 8.0 g/$cm^3$)

A polishing rate ratio is a relative value in a case where a polishing rate in Comparative Example 1 obtained by using the above formula is assumed to be 1 (reference). Note that the polishing rate in Comparative Example 1 was 0.170 μm/min (5) Pit Pits were measured using a three-dimensional surface structure analyzing microscope utilizing a scanning white interference method, manufactured by Zygo Corp. Pits were measured using a measurement apparatus, manufactured by Zygo Corp. (New View 8300 (lens: 1.4 times, zoom: 1.0 time) and an analysis software (Mx), manufactured by Zygo Corp. In the obtained shape profile, a case where almost no pit was observed was evaluated as "○ (good)". A case where few pits were observed was evaluated as "Δ (allowable)". A case where many pits were observed was evaluated as "x (not allowable)". In the case where the evaluation was "x (not allowable)", a pit could be observed visually.

(6) Waviness (Zygo-Sa)

Waviness (Sa) of an aluminum disk was measured using a three-dimensional surface structure analysis microscope utilizing a scanning white interference method, manufactured by Zygo Corp. (hereinafter, waviness measured by this method is referred to as "Zygo-Sa"). As measurement conditions, a measurement apparatus manufactured by Zygo Corp. (New View 8300 (lens: 1.4 times, zoom: 1.0 time), a wavelength of 100 to 500 μm, and a measurement area of 6 mm×6 mm were used, and analysis was performed using an analysis software (Mx) manufactured by Zygo Corp. "Unmeasurable in waviness" indicates that a pit is observed and waviness cannot be measured by the above measurement method.

TABLE 1

| | Colloidal silica | | Fumed silica | | Wet-process silica particles | | | | | | |
| --- | --- | --- | --- | --- | --- | --- | --- | --- | --- | --- | --- |
| | Average primary particle size (nm) | Ratio in all the silica particles (% by mass) | Average particle size (nm) | Ratio in all the silica particles (% by mass) | Average particle size (nm) | Ratio in all the silica particles (% by mass) | Concentration of all the silica particles (% by mass) | pH | Polishing rate ratio (Comparative Example 1 - 1) | Pit | Waviness Zygo-Sa (Å) |
| Comparative Example 1 | 50 | 30 | 270 | 70 | — | — | 4 | 1.3 | 1.00 | ○ | 1.07 |
| Example 1 | 50 | 30 | 270 | 50 | 280 | 20 | 4 | 1.3 | 1.10 | ○ | 1.07 |
| Comparative Example 2 | 80 | 30 | 270 | 70 | — | — | 4 | 1.3 | 0.99 | ○ | 1.09 |
| Example 2 | 80 | 30 | 270 | 50 | 280 | 20 | 4 | 1.3 | 1.09 | ○ | 1.09 |
| Comparative Example 3 | 50 | 30 | — | — | 280 | 70 | 4 | 1.3 | 1.01 | ○ | 1.52 |

TABLE 1-continued

| | Colloidal silica | | Fumed silica | | Wet-process silica particles | | | | | | |
|---|---|---|---|---|---|---|---|---|---|---|---|
| | Average primary particle size (nm) | Ratio in all the silica particles (% by mass) | Average particle size (nm) | Ratio in all the silica particles (% by mass) | Average particle size (nm) | Ratio in all the silica particles (% by mass) | Concentration of all the silica particles (% by mass) | pH | Polishing rate ratio (Comparative Example 1 - 1) | Pit | Waviness Zygo-Sa (Å) |
| Example 3 | 50 | 30 | 270 | 30 | 280 | 40 | 4 | 1.3 | 1.07 | ○ | 1.31 |
| Comparative Example 4 | 80 | 30 | — | — | 280 | 70 | 4 | 1.3 | 1.16 | ○ | 1.56 |
| Example 4 | 80 | 30 | 270 | 30 | 280 | 40 | 4 | 1.3 | 1.16 | ○ | 1.36 |
| Comparative Example 5 | 50 | 30 | — | — | 350 | 70 | 4 | 1.3 | 1.47 | ○ | 2.26 |
| Example 5 | 50 | 30 | 270 | 30 | 350 | 40 | 4 | 1.3 | 1.47 | ○ | 2.05 |
| Comparative Example 6 | 80 | 30 | — | — | 350 | 70 | 4 | 1.3 | 1.45 | ○ | 2.27 |
| Example 6 | 80 | 30 | 270 | 30 | 350 | 40 | 4 | 1.3 | 1.45 | ○ | 2.07 |
| Comparative Example 7 | — | — | 270 | 50 | 280 | 50 | 4 | 1.3 | 0.82 | x | Unmeasurable |
| Comparative Example 8 | — | — | 270 | 50 | 350 | 50 | 4 | 1.3 | 1.12 | x | Unmeasurable |

(7) Discussion

Results in Table 1 indicate that the polishing composition obtained by combining three different silica particles of colloidal silica, fumed silica, and wet-process silica particles in Examples 1 to 6 is improved in a balance between a polishing rate and surface smoothness (pit and waviness) after polishing than the polishing composition obtained by combining two different silica particles in Comparative Examples 1 to 8 (a combination of colloidal silica and fumed silica, a combination of colloidal silica and wet-process silica particles, or a combination of fumed silica and wet-process silica particles). Comparison between each Comparative Example and each Example will be specifically described below.

Comparative Example 1 is a combination of colloidal silica and fumed silica. Example 1 in which a part of fumed silica is replaced with wet-process silica particles has a polishing rate obviously larger than Comparative Example 1, and has a pit and waviness equivalent to Comparative Example 1.

Comparative Example 2 is a polishing composition in which the average primary particle size of colloidal silica is larger than Comparative Example 1. In such a polishing composition, Example 2 in which a part of fumed silica is replaced with wet-process silica particles has a polishing rate obviously larger than Comparative Example 2, and has a pit and waviness equivalent to Comparative Example 2.

Comparative Example 3 is a combination of colloidal silica and wet-process silica particles. Example 3 in which a part of wet-process silica particles is replaced with fumed silica has a polishing rate obviously larger than Comparative Example 3, and has a pit equivalent to Comparative Example 3 and waviness remarkably better than Comparative Example 3. Comparative Example 4 is a polishing composition in which the average primary particle size of colloidal silica is larger than Comparative Example 3. In such a polishing composition, Example 4 in which a part of wet-process silica particles is replaced with fumed silica has a polishing rate and a pit equivalent to Comparative Example 4, and has waviness remarkably better than Comparative Example 4.

Comparative Example 5 is a polishing composition in which the average particle size of wet-process silica particles is larger than Comparative Example 3. In such a polishing composition, Example 5 in which a part of wet-process silica particles is replaced with fumed silica has a polishing rate and a pit equivalent to Comparative Example 5, and has waviness remarkably better than Comparative Example 5. Comparative Example 6 is a polishing composition in which the average particle size of wet-process silica particles is larger than Comparative Example 4. In such a polishing composition, Example 6 in which a part of wet-process silica particles is replaced with fumed silica has a polishing rate and a pit equivalent to Comparative Example 6, and has waviness remarkably better than Comparative Example 6.

Comparative Example 7 is a combination of fumed silica and wet-process silica particles, generates many pits, and makes waviness unmeasurable. Comparative Example 8 is a polishing composition in which the average particle size of wet-process silica particles is larger than Comparative Example 7, generates many pits, and makes waviness unmeasurable as in Comparative Example 7.

As clarified by the comparison between each Comparative Example and each Example, the polishing rate of the combination of three different silica particles in Examples 1 to 6 is significantly higher than prediction with respect to a polishing rate predicted from the combination of two different silica particles in Comparative Examples 1 to 8. This is because it is considered that the polishing rate is improved as a synergistic effect due to a mutually complementary relationship in terms of polishing performance among colloidal silica, fumed silica, and wet-process silica particles.

Similarly to the discussion on the polishing rate, polishing performance of the polishing composition obtained by combining the three different silica particles in Examples 1 to 6 is improved also in surface smoothness such as a pit or waviness. Also here, it is considered that the surface smoothness is improved as a synergistic effect due to a mutually complementary relationship in terms of polishing performance among colloidal silica, fumed silica, and wet-process silica particles.

The polishing composition for a magnetic disk substrate according to at least one embodiment can be used for polishing an electronic component of a magnetic recording medium such as a hard disk. Particularly, the polishing composition according to at least one embodiment can be used for polishing a surface of a substrate for a magnetic recording medium such as a glass magnetic disk substrate or an aluminum magnetic disk substrate. Furthermore, the polishing composition according to at least one embodiment can be used for polishing a surface of an aluminum magnetic disk substrate for a magnetic recording medium having an electroless nickel-phosphorus plated film formed on a surface of an aluminum alloy substrate.

What is claimed is:

1. A polishing composition for a magnetic disk substrate, comprising:
    colloidal silica having an average primary particle size of 5 to 200 nm;
    fumed silica having an average particle size of 30 to 800 nm;
    pulverized wet-process silica particles having an average particle size of 100 to 1000 nm; and
    water,
    wherein a ratio of the colloidal silica is 5 to 90% by mass, a ratio of the fumed silica is 5 to 90% by mass, and a ratio of the pulverized wet-process silica particles is 5 to 90% by mass with respect to all the silica particles, and a concentration of all the silica particles is 1 to 50% by mass.

2. The polishing composition for the magnetic disk substrate according to claim 1, wherein the colloidal silica has an average primary particle size of 10 to 150 nm, the fumed silica has an average particle size of 60 to 600 nm, and the pulverized wet-process silica particles have an average particle size of 200 to 800 nm.

3. The polishing composition for the magnetic disk substrate according to claim 1, wherein a ratio of the colloidal silica is 10 to 80% by mass, a ratio of the fumed silica is 10 to 80% by mass, and a ratio of the pulverized wet-process silica particles is 10 to 80% by mass with respect to all the silica particles.

4. The polishing composition for the magnetic disk substrate according to claim 1, wherein a concentration of all the silica particles is 2 to 40% by mass.

5. The polishing composition for the magnetic disk substrate according to claim 1, wherein the polishing composition further contains an acid, and has a pH value (25° C.) of 0.1 to 4.0.

6. The polishing composition for the magnetic disk substrate according to claim 1, wherein the polishing composition further contains an oxidizing agent.

7. The polishing composition for the magnetic disk substrate according to claim 1, used for polishing an electroless nickel-phosphorus plated aluminum magnetic disk substrate.

* * * * *